United States Patent [19]

Baumers

[11] 4,067,244

[45] Jan. 10, 1978

[54] SELF-PROPELLED VIBRATORY PLATE

[75] Inventor: Hans Baumers, Dusseldorf-Hubbelrath, Germany

[73] Assignee: Losenhausen Maschinenbau AG, Dusseldorf, Germany

[21] Appl. No.: 704,478

[22] Filed: July 12, 1976

Related U.S. Application Data

[63] Continuation of Ser. No. 532,924, Dec. 16, 1976.

[51] Int. Cl.[2] .............. F16H 33/00

[52] U.S. Cl. .............. 74/61

[58] Field of Search .............. 74/61; 248/18; 428/432

[56] References Cited

U.S. PATENT DOCUMENTS

| | | | |
|---|---|---|---|
| 2,921,475 | 1/1960 | Kindler | 74/61 |
| 2,973,895 | 3/1961 | Brown et al. | 248/18 |
| 3,530,577 | 9/1970 | Franklin et al. | 74/61 |
| 3,719,911 | 3/1973 | Tomita | 428/432 |

*Primary Examiner*—Benjamin W. Wyche

*Assistant Examiner*—Wesley S. Ratliff, Jr.

*Attorney, Agent, or Firm*—Darbo & Vandenburgh

[57] ABSTRACT

A vibratory plate includes a ground plate, a vibration generator adjacent the front of the ground plate and a motor driving the vibration generator. The ground plate includes a sole plate, an upwardly inclined portion at the rear of the sole plate, two successive upwardly inclined portions at the front of the sole plate and an upwardly and rearwardly inclined portion from the front of the ground plate to the casing of the vibration generator. Extending downwardly from the casing of the vibration generator to the ground plate are supporting ribs positioned in the planes of the bearings of the vibration generator. A transverse rib extends upwardly from the ground plate at the rear of the supporting ribs. The ground plate, the ribs and the casing are an integral unit. In one embodiment that unit is cast aluminum with a steel facing on the bottom of the sole plate. In a second embodiment they are fiberglass reinforced plastic with a steel facing on the bottom of the sole plate.

18 Claims, 2 Drawing Figures

Fig. 1
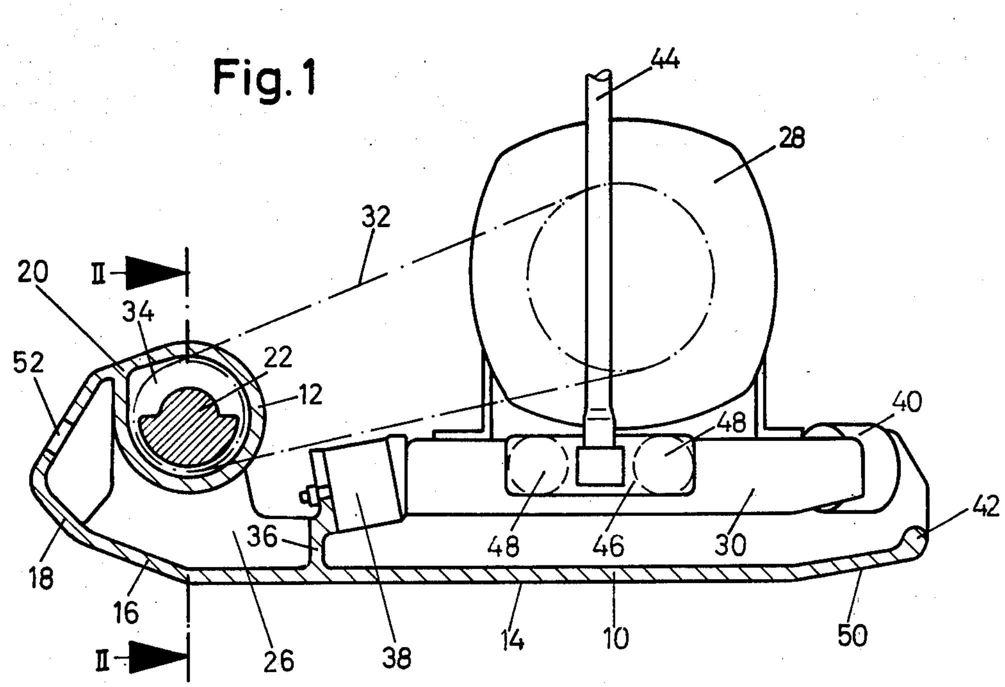
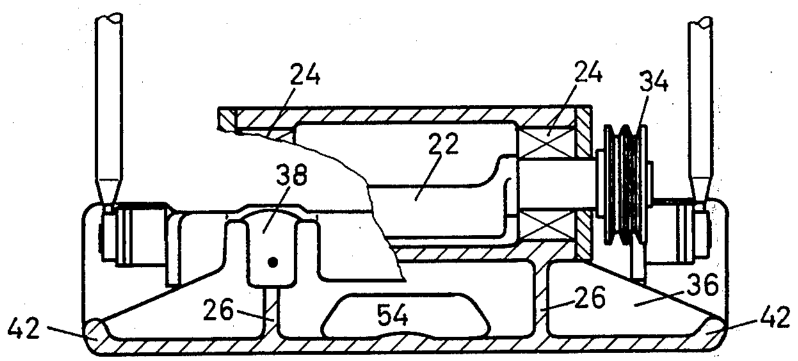
Fig. 2

SELF-PROPELLED VIBRATORY PLATE

RELATED APPLICATION

This application is a continuation of my application Ser. No. 532,924 filed Dec. 16, 1976.

BACKGROUND AND SUMMARY OF THE INVENTION

This invention relates to a self-propelled vibratory plate excited by unbalance vibrations and comprising an unbalance vibrator of the type having casing, a rotating unbalanced rotor mounted in said casing for generating a rotating eciting centrifugal force, said casing being located on the front portion of a ground plate, said unbalance vibrator being in drive connection with an engine, which is supported on said ground plate through resilient elements.

Such a vibratory plate, having an unbalance vibrator for generating rotating forces located near its forward end, moves in a forward direction when the vibrator is in operation. Due to the centrifugal force of the vibrator, the plate is alternatingly pressed down to the ground or lifted from the ground. Immediately following the "pressing-down phase" the ground plate remains in contact with the ground. This results in the then acting rearward component of the centrifugal force failing to produce any corresponding movement of the vibratory plate. Subsequently, the plate is lifted from the ground by the upward-acting centrifugal force. During this subsequent "flight phase", one component of the centrifugal force is forward-acting, whereby the vibratory plate is moved a short distance forward, until it is again pressed down to the ground by the then downward-acting centrifugal force. With this type of machine, the compacting effect is achieved by the alternating forces exerted by the unbalance vibrator. It is necessary, on one hand, to achieve a sufficient forward movement and, on the other hand, not to consume the major portion of the centrifugal force exerted by the unbalance vibrator by accelerating the mass of the ground. Therefore, the ground plate has to be as lightweight as possible but has, nevertheless, to provide sufficient rigidity.

A lightweight ground plate can be achieved by the use of thin material, for example, by the use of welded structures from the steel plate. Using a thin material, however, necessitates optimum structural design in order, on one hand, to provide the required rigidity of the whole structure and, on the other hand, to make sure that the saving in weight achieved by small thickness of the material is not compensated by an increase in weight due to the required additional reinforcements.

It is an object of the invention to provide a self-propelling vibratory plate of the type defined in the beginning in which sufficient rigidity is achieved with low weight of the plate, resulting in good compacting power and high traveling speed of the vibratory plate.

In accordance with the invention, said casing of the unbalance vibrator is integral with said ground plate and is, on one hand, integral with the upwardly extending front edge of the ground plate substantially along the total width thereof and, on the other hand, is supported on the ground plate through ribs which are located in the bearing planes of the rotor shaft.

Thus, there is a reinforcement of the ground plate in the area exposed to particular load, this reinforcement being effected by the vibrator casing integral with the ground plate, and the ribs, which together form a rigid structure. Through the ribs, the downward-acting component of the centrifugal force is transmitted without bending moments to the ground plate.

Use of a welded structure will result in a rather high proportion of welding work. For this reason, it is advantageous if the ground plate, the vibrator casing and said ribs are one integral cast body. Furthermore, the space limitations may be such as to make welding impractical due to lack of accessibility to the joints to be welded.

The self-propelling characteristics of the vibratory plate can be improved by having the underside of the front end of the ground plate in the form of a double bevel. The forward-most bevel, which is the steeper of the two, permits the ground plate to climb even on rather high projecting ground portions, while the adjacent less steep bevel permits such ground portions to be compressed by the vertical component of the centrifugal force at a more favorable angle.

From the front edge of this double bevel, the structure may extend upwardly and rearwardly, the portion at said forward edge being connected to the vibrator casing. This results in a substantially closed cover along the front of the ground plate and a favorable rigid structure comprising the double beveled portion, the front edge portion and the ribs.

The front edge portion may have an aperture therethrough in the space between the ribs. This aperture enables the machine to be engaged in order to lift the front portion of the machine or to pull the machine away from an obstacle, etc. In addition, the aperture is advantageous from the point of view of making the casting. The ground plate may be slightly beveled at its rear. In addition, the ground plate may have reinforcements along its side edges. To provide a further reinforcement there may be a transverse reinforcing rib on the upper surface of the ground plate, said reinforcing rib being integral, on one hand, with the ground plate and, on the other hand, with the rear edges of said ribs in the bearing planes of the rotor shaft. Also, this results in increased rigidity of the structure. The transverse reinforcing rib may have a central aperture substantially in alignment with the aperture of the forward edge portion. Thus, for example, a hauling rope may extend through the two apertures and below the vibrator casing.

The engine may be mounted on an engine plate, which is resiliently supported at its front and rear ends on the ground plate through cylindrical rubber elements, at least the front rubber elements having their axes substantially in longitudinal direction of the ground plate. Thus the resiliency of the rubber elements keeps a belt between the engine and the unbalance vibrator permanently tensioned so that the tension does not relax by vibrations of the engines, particularly in the resonance range. Such a relaxing of the tension could result in a decrease of the transmitted power. By maintaining the tension, it becomes possible to use an engine of reduced peak power output. Advantageously the front rubber elements are supported on the ground plate through said reinforcing rib.

A particularly lightweight construction is achieved in that said ground plate is cast from aluminum and has a steel facing on its bottom surface. Alternatively, the ground plate may be made of fiberglass reinforced plastic with a steel facing on its bottom surface. In both cases the steel facing may be adhesively secured to the bottom surface of the main body of the ground plate.

DESCRIPTION OF THE DRAWINGS

FIG. 1 is a side elevation, partly in section, of a vibratory plate of the invention; and FIG. 2 is a sectional view taken along line II—III of FIG. 1.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The illustrated embodiment includes a cast ground plate 10. A casing 12 of the unbalance vibrator is cast as an integral part of the ground plate. The ground plate 10 has a flat sole portion 14. At the front of the sole is a double beveled section comprising bevel portions 16 and 18, the forward-most portion 18 being steeper than portion 16. From the front edge of portion 18 there is an upper portion 20 which extends upwardly and rearwardly. The rear of the upper portion 20 is integral with the casing 12 of the unbalance vibrator substantially along its whole width. A rotor 22 rotates in the casing 12 and forms an eccentric centrifugal weight or flyweight. Integral ribs 26 are provided in the plane of the bearings 24 of the rotor 22, the vibrator casing 12 being supported on the ground plate 10 through these ribs.

The rotor 22 is driven by a motor 28 through a belt 32 and a pulley 34. Engine 28 is mounted on a motor plate 30.

A reinforcing rib 36 extends transversely across the flat portion 14 of the ground plate 10. The reinforcing rib 36 is integral with the rear edges of the ribs 26 and is made as one integral cast body with these ribs and the ground plate 10.

The motor plate 30 is supported on the ground plate 10 through front and rear cylindrical rubber elements 38 and 40, respectively. At least the front rubber elements 38 have their axes positioned substantially in alignment with the longitudinal direction of the vibratory plate. The front rubber elements 38 bear against the reinforcing rib 36. The ground plate has reinforcements 42 along its side edges.

The two lower ends of a guide yoke 44 are affixed to plates 46. There is a plate 46 at each side of motor 28 and each plate is affixed to the motor plate 30 through cylindrical rubber elements 48. The rubber elements insulate the guide yoke 44 against vibrations of the motor plate 30.

The ground plate 10 has a slight upward bevel 50 at the rear of sole portion 14.

The forward portion 20 has an aperture 52 centered between the sides and in the area generally between the two ribs 26. An aperture 54 substantially in alignment therewith is provided in the reinforcing rib 36.

I claim:

1. In a self-propelled vibratory plate excited by unbalance vibrations and comprising a ground plate having a front and a rear, a sole plate and an upwardly extending part at the front of the sole plate; an unbalance vibrator including a casing, an eccentric centrifugal weight for generating an exciting force, and means including bearings rotatably mounting the weight in said casing for rotation about a horizontal axis transverse to the front to rear direction, said casing being adjacent the front of the ground plate, remote from the rear of the ground plate and above the ground plate; a motor operatively connected to said weight to rotate the weight, said motor being positioned between the casing and the rear of the ground plate; and resilient elements supporting the motor on the ground plate, the improvement comprising:

said casing being integral with said upwardly extending part of the ground plate along substantially the total width thereof, ribs positioned in the planes of said bearings, said ribs being integral with said ground plate and said casing.

2. In a vibratory plate as set forth in claim 1, wherein the ground plate, the vibrator casing and said ribs are one integral cast body.

3. In a vibratory plate as set forth in claim 2, wherein said upwardly extending part has a front edge, said upwardly extending part including two portions between said front edge and said sole plate, said two portions being at different angles of bevel with respect to said sole plate.

4. In a vibratory plate as set forth in claim 3, wherein said upwardly extending part includes a third part between said front edge and said casing, said third part extending upwardly and rearwardly from said front edge.

5. In a vibratory plate as set forth in claim 4, wherein the ribs are separated and define a space therebetween, said third portion has an aperture therethrough in the general location of said space.

6. In a vibratory plate as set forth in claim 5, including a transverse rib on the top of the ground plate and generally to the rear of the first mentioned ribs, said transverse rib being integral with the ground plate and with the first mentioned ribs.

7. In a vibratory plate as set forth in claim 6, wherein said transvere rib has a central aperture substantially in alignment with the aperture in said third portion.

8. In a vibratory plate as set forth in claim 2, wherein said ground plate, said ribs and said casing are cast aluminum, said sole plate having a steel facing on its bottom side.

9. In a vibratory plate as set forth in claim 8, wherein said steel facing is adhesively affixed to said bottom side.

10. In a vibratory plate as set forth in claim 1, wherein said sole plate is fiberglass reinforced plastic and has a steel facing on its bottom side.

11. In a vibratory plate as set forth in claim 10, wherein said steel facing is adhesively affixed to said bottom side.

12. In a vibratory plate as set forth in claim 1, including a transverse rib on the top of the ground plate and generally to the rear of the first mentioned ribs, said transverse rib being integral with the ground plate and with the first mentioned ribs.

13. In a vibratory plate as set forth in claim 12, including an engine plate, said resilient elements comprising front cylindrical rubber elements resiliently supporting said engine plate on said ground plate, said front elements having cylindrical axes substantially in alignment with the front to rear direction of said ground plate, said engine being mounted on said engine plate.

14. In a vibratory plate as set forth in claim 13, wherein said front elements bear against said transverse rib.

15. In a vibratory plate as set forth in claim 1, including an engine plate, said resilient elements comprising front cylindrical rubber elements resiliently supporting said engine plate on said ground plate, said front elements having cylindrical axes substantially in alignment with the front to rear direction of said ground plate, said engine being mounted on said engine plate.

16. In a vibratory plate as set forth in claim 1, wherein said upwardly extending part has a front edge, said upwardly extending part including two portions between said front edge and said sole plate, said two portions being at different angles of bevel with respect to said sole plate.

17. In a vibratory plate as set forth in claim 1, wherein said ground plate includes a portion between the sole plate and the rear of the ground plate, said position being at a slight bevel with respect to the sole plate.

18. In a vibratory plate as set forth in claim 1, wherein said ground plate has side edges and includes integral reinforcements along said side edges.

* * * * *